United States Patent
Abe et al.

(10) Patent No.: US 7,110,273 B2
(45) Date of Patent: Sep. 19, 2006

(54) INVERTER CONTROLLING METHOD

(75) Inventors: Seiya Abe, Osaka (JP); Koichi Kishida, Osaka (JP)

(73) Assignee: Daihen Corporation, Osaka (JP)

( * ) Notice: Subject to any disclaimer, the term of this patent is extended or adjusted under 35 U.S.C. 154(b) by 0 days.

(21) Appl. No.: 11/114,802

(22) Filed: Apr. 26, 2005

(65) Prior Publication Data

US 2005/0243584 A1 Nov. 3, 2005

(30) Foreign Application Priority Data

Apr. 28, 2004 (JP) .............................. 2004-132631

(51) Int. Cl.
*H02M 7/00* (2006.01)
(52) U.S. Cl. ........................... 363/71; 363/72; 323/906
(58) Field of Classification Search ................. 363/72, 363/71; 323/906
See application file for complete search history.

(56) References Cited

U.S. PATENT DOCUMENTS 4,891,744 A * 1/1990 Yamamoto et al. ........... 363/89
5,602,462 A * 2/1997 Stich et al. ................. 323/258
5,615,129 A * 3/1997 Stich et al. ................. 700/297
5,684,383 A * 11/1997 Tsuji et al. ................. 320/134
5,703,469 A * 12/1997 Kinoshita .............. 340/636.19
6,175,512 B1 1/2001 Hagihara et al.
6,285,572 B1 9/2001 Onizuka et al.

FOREIGN PATENT DOCUMENTS

| JP | 8-33211 | 2/1996 |
| JP | 11-341816 | 12/1999 |
| JP | 2000-305633 | 11/2000 |

* cited by examiner

*Primary Examiner*—Bao Q. Vu
(74) *Attorney, Agent, or Firm*—Hamre, Schumann, Mueller & Larson, P.C.

(57) ABSTRACT

An inverter controlling method is provided for a power system that includes a DC power source and a plurality of inverters connected in parallel to the power source. The method includes the steps of: measuring output power of the power source at a plurality of periodic points; calculating a moving average at each periodic point based on the measured output power; calculating a regression curve by utilizing moving averages at a current periodic point and past periodic points; estimating output power at a next periodic point based on the regression curve; and determining, based on the estimated output power, how many inverters to be actuated.

5 Claims, 9 Drawing Sheets

INVERTER CONTROLLING METHOD

BACKGROUND OF THE INVENTION

1. Field of the Invention

The present invention relates a power system for converting DC output from a DC power source (such as a solar cell) into AC output by utilizing an inverter for power supply to an AC system. In particular, the present invention relates to a DC-AC conversion technique with the use of a plurality of inverters, for attaining efficient conversion of DC output into AC output.

2. Description of the Related Art

Referring to FIG. 6, the block diagram illustrates a conventional power system. As shown in the figure, the power system comprises a direct current power source DC (a solar cell), a first through a third inverters PS1–PS3 connected in parallel to the power source DC, a power detector DS for detecting the output power from the power source DC, an output controller SC for controlling the inverters in accordance with the output power, and switches SW1–SW3 for connecting or disconnecting the inverters with respect to the power source DC.

As shown in FIG. 6, the first inverter PS1 comprises a first inverter control circuit CO1 and a first inverter circuit PC1. The second inverter PS2 comprises a second inverter control circuit CO2 and a second inverter circuit PC2. The third inverter PS3 comprises a third inverter control circuit CO3 and a third inverter circuit PC3.

Upon receiving a start signal from the output controller SA, the first inverter control circuit CO1 starts to operate and close the first switch SW1, so that the power outputted from the power source DC is supplied to the first inverter circuit PC1. At the same time, the control circuit CO1 actuates the inverter circuit PC1, which converts the DC voltage into AC voltage to be supplied to the system power source AC. The second inverter control circuit CO2 and the third inverter control circuit CO3 operate in the same manner as described above.

The power detector DS detects the output power from the power source DC and inputs the result into the output controller SA. The output controller SA comprises an output power calculating unit CA and an inverter selector CH. The output power calculating unit CA periodically measures the output power at regular time intervals, and determines, based on the measurements, how many inverters to be actuated. Then, in accordance with the determined number of the inverters, the inverter selector CH sends a start signal to the relevant inverters.

FIG. 7 is a timing chart for describing the operation of the conventional system. In this system, when the output power from the DC source exceeds a predetermined reference value (not shown) at time t=t3, the output power calculating unit CA outputs a start signal for actuating one or more of the currently idle inverters. However, as shown in FIG. 7, the additional inverter(s) needs operation delay time T1 (several tens of seconds, for example) after the start signal is inputted, until its output supply becomes stable. Due to this operational delay, the output power indicated by hatching in FIG. 7 cannot be properly converted, whereby the system power source AC fails to receive an appropriate power supply.

As one way to address the above problem, JP-A-H11(1999)-341816 teaches the following technique. While the current source DC (see FIG. 6) supplies power, this output power is measured at predetermined time intervals (each interval may be several tens of milliseconds, for example). Then, the differential quotient of the output power is calculated for the past few minutes, and it is determined whether or not the quotient tends to increase.

If the differential quotient is on an increasing trend, the output power at the next periodic point t=t3 is estimated based on the above quotient, and then it is determined whether or not the estimated power output is beyond the capacity of the currently operating inverter(s). When the estimated power output is beyond the current capacity, a start signal for actuating another inverter is outputted at the time t=t2. As a result, at t=t3, the operation of the additionally actuated inverter will be stable. In this manner, since the output power does not exceed the capacity of the inverters, the output power from the power source DC can be efficiently converted.

According to the above-described method, the estimation of the output power at the next periodic point can be performed accurately when the increase of the output power is moderate, as in the case shown in FIG. 8. As shown in FIG. 9, however, the output power may decrease sharply for the measurement time, and then may increase. In such a case, since the output power at the time t=t3 is estimated based on the decreasing differential quotient, the number of inverters to be actuated at t3 will be decreased, even though the actual output power will increase after the time t=t2. As a result, the output power at t3 exceeds the capacity of the inverters, whereby it cannot be properly supplied to the system power source AC.

SUMMARY OF THE INVENTION

It is, therefore, an object of the present invention to provide an inverter controlling method capable of solving the above-described problems.

According to the present invention, there is provided an inverter controlling method for a power system that includes a DC power source and a plurality of inverters connected in parallel to the power source. The method comprises the steps of: measuring output power of the power source at a plurality of periodic points; calculating a moving average at each periodic point based on the measured output power; calculating a regression curve by utilizing moving averages at a current periodic point and past periodic points; estimating output power at a next periodic point based on the regression curve; and determining, based on the estimated output power, how many inverters to be actuated.

In the above method, the moving averages are calculated by averaging the output power for a predetermined period, and the regression curve is calculated based on the moving averages. Then, the output power of the next periodic point is estimated by the regression curve. In this manner, even when the output power from the power source changes sharply during the output power estimating period, the sharp change of the output power is hidden by the moving average. As a result, the estimation error of the output power at the next periodic point is considerably lessened.

Preferably, the method of the present invention may further comprise the steps of: calculating a power difference between the moving average and the measured output power at each periodic point; calculating an adjusting value at each periodic point by utilizing the power difference at the periodic point; calculating a moving average revised value at each periodic point by adding the adjusting value at the periodic point to the moving average. The calculation of the regression curve is performed based on the moving average revised values at the current periodic point and the past periodic points.

With such an arrangement, the moving average can be corrected in view of the difference between the moving average and the actual output power. With these moving average revised values, a more accurate regression curve for estimating the output power at the next periodic point is obtained. Consequently, the estimation of the output power at the next periodic point can be performed more accurately with the use of the improved regression curve, whereby more reliable determination of the number of the inverters to be additionally actuated can be performed.

Preferably, the adjusting value at each periodic point is zero when the power difference at each periodic point is smaller than a reference value, while the adjusting value is equal to the power difference multiplied by a coefficient when the power difference is no smaller than the reference value.

Preferably, the coefficient is equal to 1/n, where n is a natural number.

Preferably, the method of the present invention may further comprise two more steps: the step of calculating a power change rate at each periodic point (the rate being calculated with respect to the output powers at the current periodic point and the previous periodic point); and the step of calculating an average change rate at each periodic point (the rate being calculated with respect to the moving averages at the current periodic point and the previous periodic point). Following these calculations of two rates, the calculation of the adjusting value at each periodic point is performed based on the three values, namely, the power change rate, the average change rate and the power difference mentioned above.

According to the third aspect of the present invention, the change rates in output power and moving average between at a given periodic point and the previous periodic point are calculated. Then, with these two kinds of change rates and the above-mentioned power difference, the adjusting value is determined. In this manner, a more reliable and accurate calculation is possible for the adjusting value, whereby a more accurate estimation is possible for the output power at a desired periodic point.

Other features and advantages of the present invention will become apparent from the detailed description given below with reference to the accompanying drawings.

DETAILED DESCRIPTION OF THE PREFERRED EMBODIMENTS

Preferred embodiments of the present invention will be described below with reference to the accompanying drawings.

<Embodiment 1>

Figure 1:
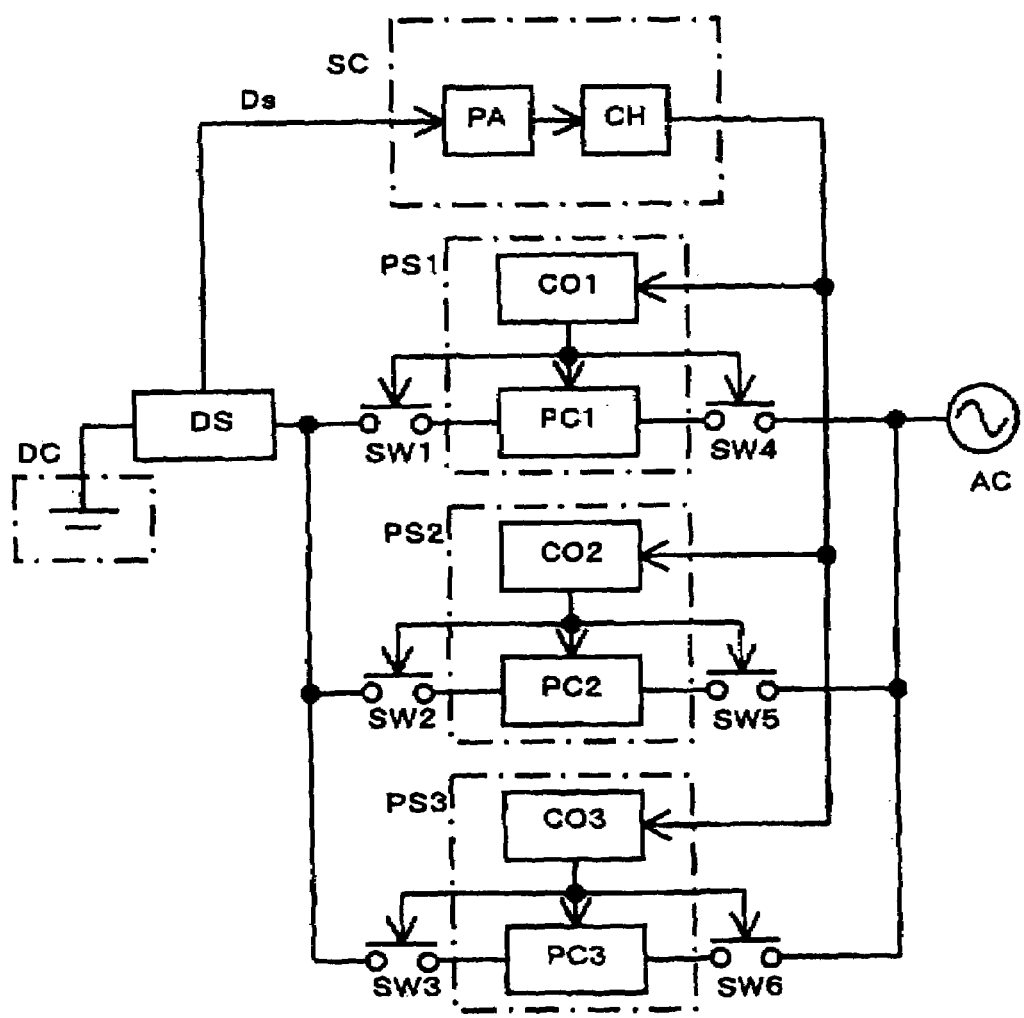
FIG. 1 is a block diagram showing a solar battery power system used for the present invention.
Figure 6:
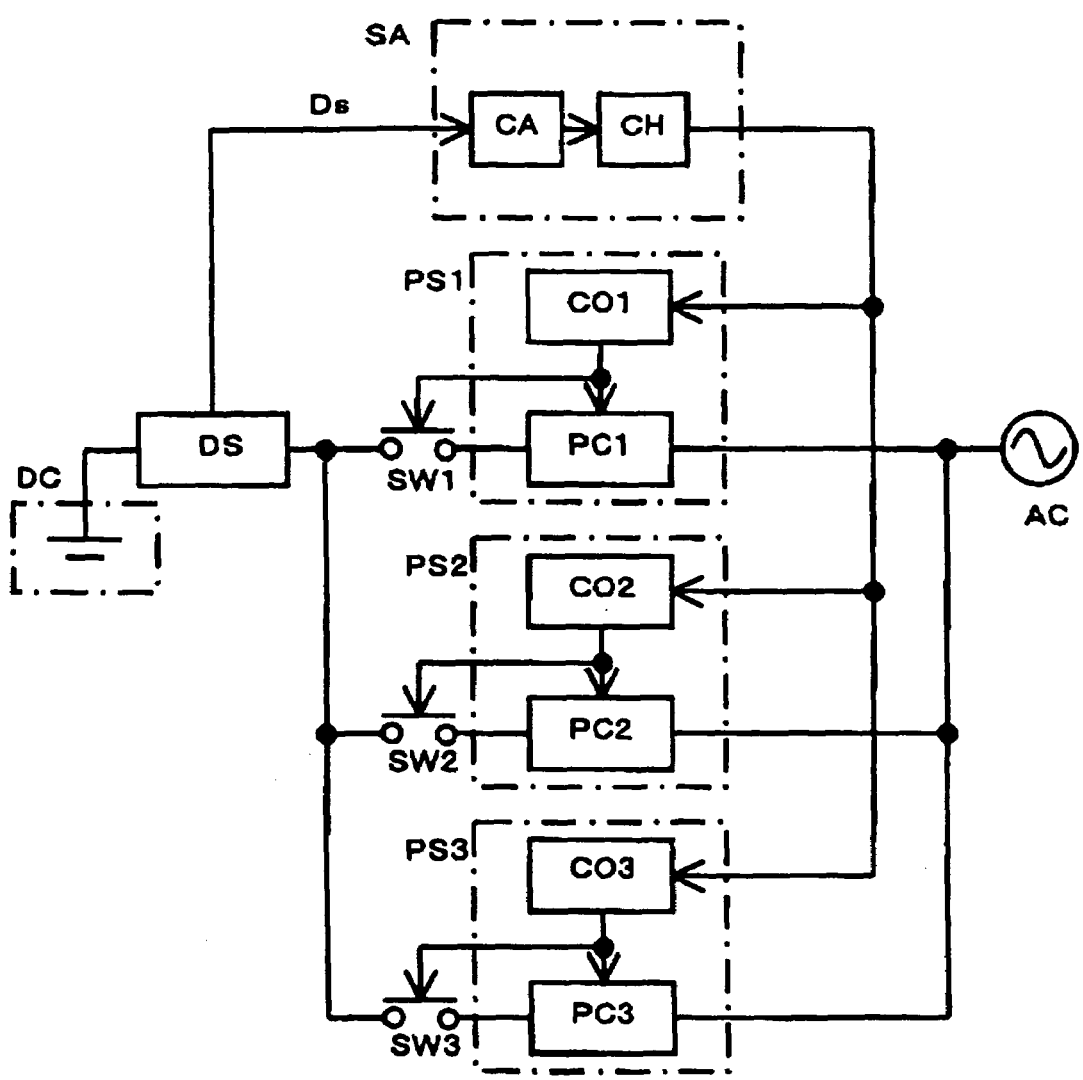
FIG. 6 is a block diagram illustrating a conventional power system using a solar battery.

FIG. 1 is a block diagram illustrating a power system to which an inverter controlling method according to the present invention is advantageously applied. In the figure, elements identical or similar (in structure, function, etc.) to those shown in FIG. 6 are indicated by the same reference signs as those used in FIG. 6.

As shown in FIG. 1, the power system comprises a direct current power source DC (a solar cell, in the illustrated example), first to third inverters PS1~PS3, a power detector DS, an output estimation controller SC, and first to sixth switches SW1~SW6. The three inverters PS1~PS3 are connected in parallel to the direct current power source DC for converting DC output into AC output. The power detector DS detects the output power from the power source DC. The output estimation controller SC controls the inverters PS1~PS3 based on the detected output power. The switches SW1–SW6 are operated for connecting and disconnecting the respective inverters to and from the power source DC. The illustrated power system uses three inverters, though the present invention is not limited to this. More than three inverters, or only two inverters, may be used for the present invention.

Upon detection of the output power from the power source DC, the power detector DS sends the detected information to the output estimation controller SC. The output estimation controller SC comprises an output power estimation calculating unit PA and an inverter selector CH. The calculating unit PA periodically measures the output power at predetermined time intervals (at predetermined "periodic points"), and calculates moving averages (of the output power) at the respective periodic points. The moving average at a given periodic point may be an arithmetic average of the output powers measured at a predetermined number of periodic points, including the given periodic point and previous periodic points before the given periodic point.

Figure 7:
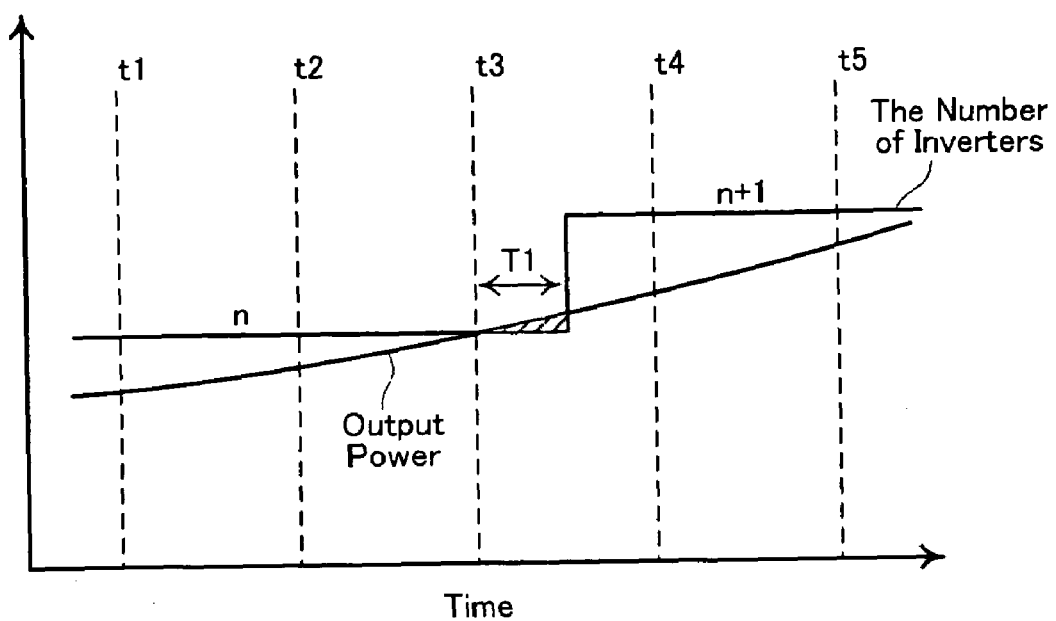
FIG. 7 is a timing chart for illustrating the operation of the conventional power system.
Figure 8:
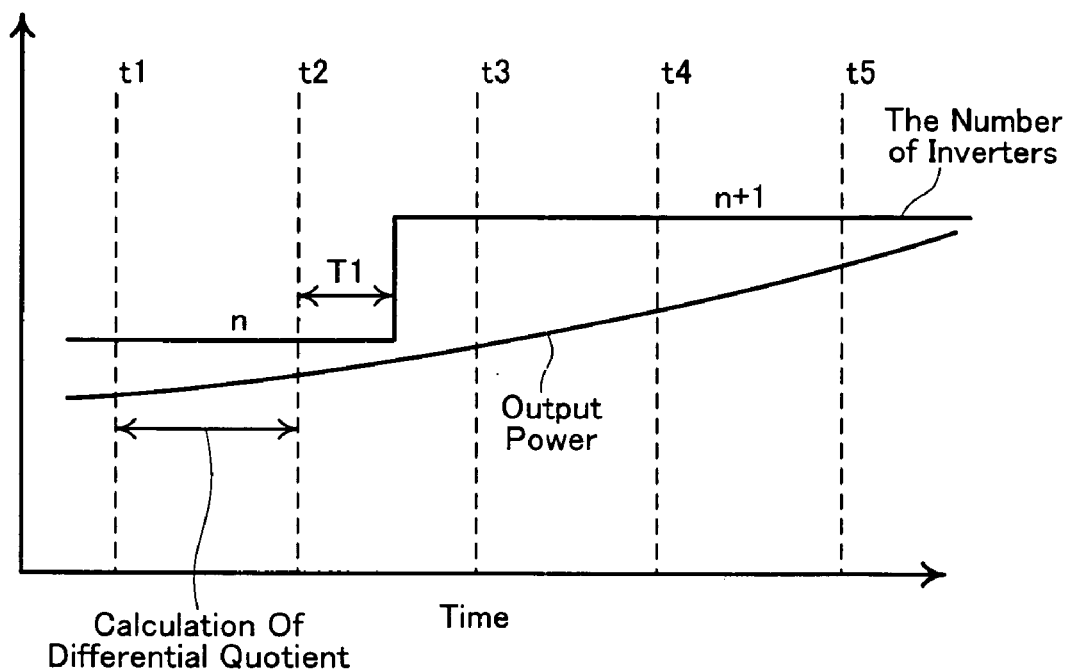
FIG. 8 is a second timing chart for illustrating the operation of the conventional power system.
Figure 9:
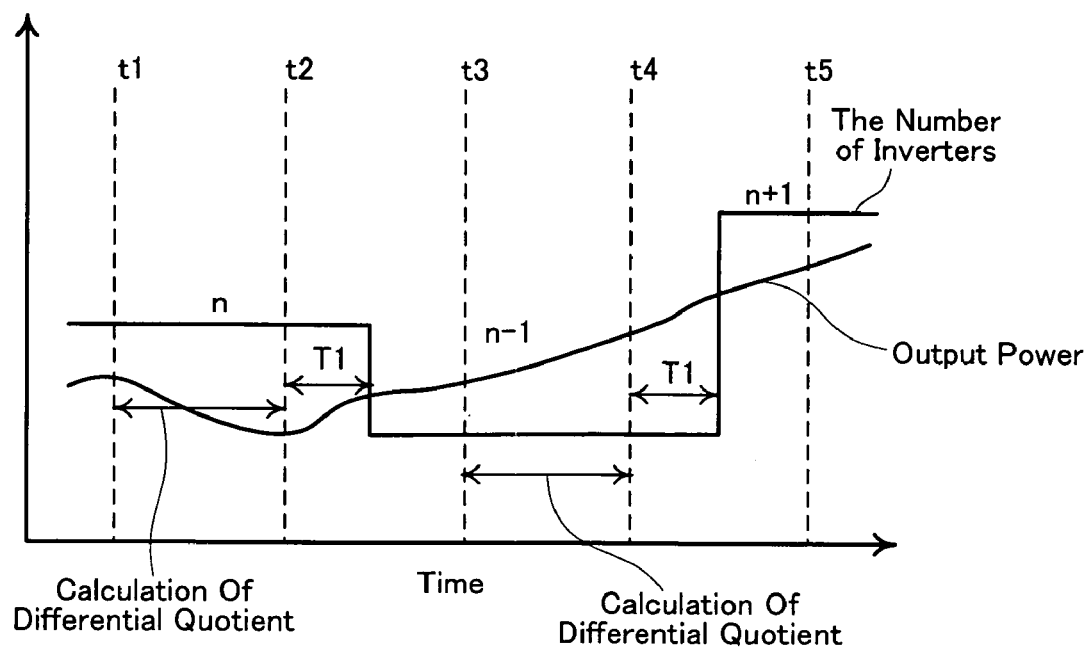
FIG. 9 is a third timing chart for illustrating the operation of the conventional power system.

More specifically, referring to FIG. 7 for example, the moving average at periodic point t3 may be calculated by averaging the output powers measured at three consecutive periodic points t1, t2 and t3 (in a case where three pieces of measurement data are used for calculating a single moving average), and the next moving average (that is, the moving average at periodic point t4) may be calculated by averaging the output powers measured at the next three consecutive periodic points t2, t3 and t4. According to the present invention, the number of pieces of measurement data used for calculating each one of the moving averages may be other than three.

Then, the calculating unit PA calculates a "moving average revised value" for each of the periodic points, the calculation being based on the actual output power and the calculated moving average for the periodic point. Then, based on the moving average revised values for a predetermined number of periodic points (including the current periodic point and previous periodic point(s)), the calculating unit PA calculates a regression curve used for estimating the output power at the next periodic point (for instance, when the current periodic point is point t3 in FIG. 7, the next periodic point is point t4, which comes one cycle).

Based on the estimated output value, the calculating unit PA determines how many inverters need be operated for performing proper DC-AC conversion of the output power at the next periodic point. Then, in accordance with the determination, the inverter selector CH sends a start signal (or no start signal if the estimated output power is zero, for example) to the determined number of inverters among all the inverters. For instance, when it is determined that only one inverter need be operated, the inverter selector CH may send a start signal to the first inverter PS1 only. When it is determined that two inverters need be operated, the inverter selector CH may send a start signal to the first and the second inverters PS1, PS2.

As shown in FIG. 1, the first inverter PS1 comprises an inverter control circuit CO1 and an inverter circuit PC1. When the start signal is inputted to the first inverter PS1 (to the control circuit CO1) from the output estimation controller SC, the control circuit CO1 closes the first and the fourth switches SW1, SW4, so that the output power from the power source DC is supplied to the inverter circuit PC1. At the same time, the control circuit CO1 turns on the inverter circuit PC1 to convert the direct voltage into an alternating voltage, which is supplied to the system power source AC. As readily seen from FIG. 1, the second and the third inverters PS2–PS3, comprising an inverter control circuit CO2 or CO3 and an inverter circuit PC2 or PC3, operate in the same manner as the first inverter PS1.

Figure 2:
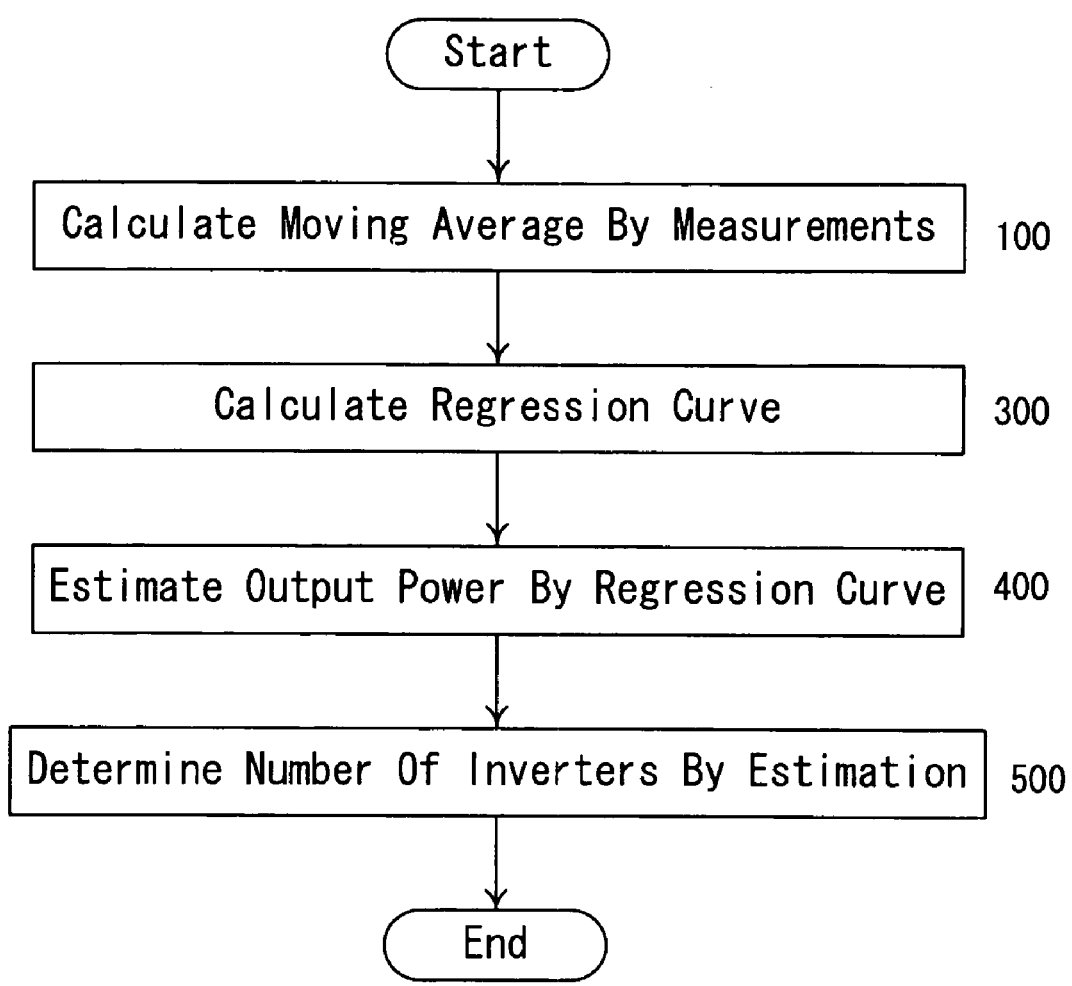
FIG. 2 is a flow chart illustrating an inverter controlling method according to a first embodiment of the present invention.

Referring now to the flow chart of FIG. 2, the inverter control method according to the first embodiment will be described below.

At Step 100, the output power from the direct current power source DS are measured at predetermined periodic points, and the measurements are subjected to the calculation of moving averages at the respective periodic points.

At Step 300, the moving averages at the current periodic point and the predetermined number of previous periodic points are subjected to the calculation of a regression curve (which may be a quadratic or cubic curve).

At Step 400, an estimated output power at the next periodic point is calculated by using the regression curve.

At Step 500, the number of inverters to be operated at the next periodic point is determined in view of the estimated output power. As an illustrative example, it is supposed that the current output power from the power source DC is 180 kW, and that two inverters, each having a rated power of 100 kW, are operating (among four or more inverters). Then, if the estimation based on the regression curve indicates that the output power at the next periodic point will be 210 kW, for example, the currently operating two inverters are insufficient for attaining proper voltage conversion (since their total output power is 200 kW). Thus, to accommodate the surplus, one of the three idle inverters is additionally operated. On the other hand, if the estimation indicates that the output power at the next periodic point will be 170 kW, for example, the currently operating two inverters can handle the voltage conversion at the next periodic point. Thus, no additional inverters are turned on.

After Step 500, the process goes back to Step 100, and the above-described routine will be repeated.

According to the inverter control method of the first embodiment, as noted above, the regression curve is calculated based on the moving averages resulting from the output powers in a predetermined period, and the output power of the next periodic point is estimated based on the regression curve. Therefore, even when the output power changes sharply during the voltage conversion procedure, the sharp change can be smoothed by the averaging. As a result, the cause of the estimation error of the output power at the next periodic point is advantageously lessened.

<Embodiment 2>

Figure 3:
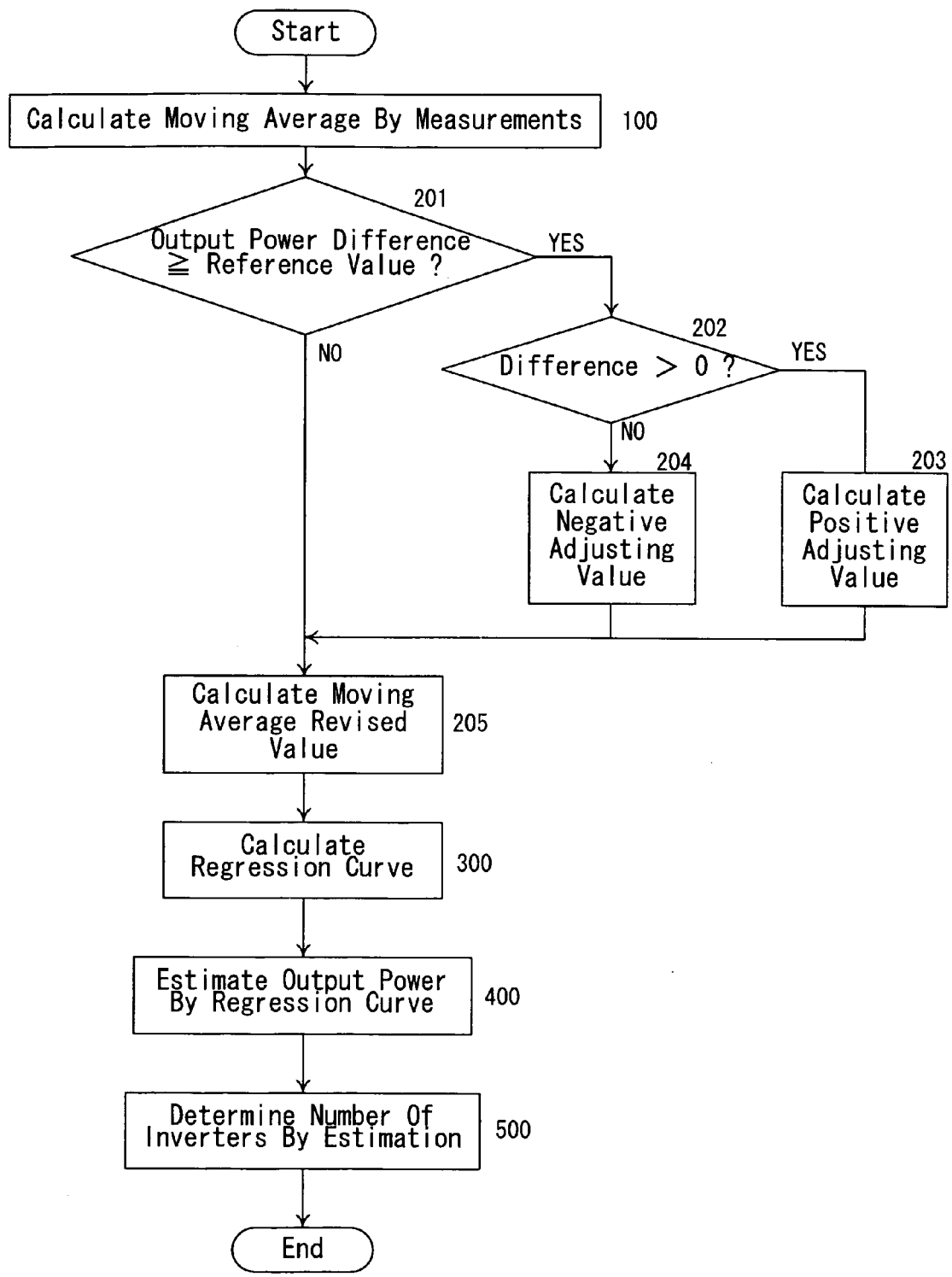
FIG. 3 is a flow chart illustrating an inverter controlling method according to a second embodiment of the present invention.

Referring now to the flow chart of FIG. 3, an inverter control method according to a second embodiment of the present invention will be described below. In the flow chart of FIG. 3, steps identical or similar to those shown in FIG. 2 are indicated by the same reference numerals (100, 300, 400 and 500).

Specifically, at Step 100, the output power from the direct current power source DS are measured at predetermined periodic points, and the measurements are subjected to the calculation of moving averages at the respective periodic points.

Then, at Step 201, an "output power difference" between the actual output power and the moving average of the powers is calculated at each of the periodic points. Taking the periodic point t3 in FIG. 7 for example, the output power from the power source DC is measured at this point, as noted above, and the moving average for this point is calculated by averaging e.g. three output powers measured at the current point (namely, t3) and previous two points (namely, t1 and t2). Then, subtracting the moving average (calculated for the point t3) from the actual output power (measured at the point t3) gives the output power difference at the point t3. In the same manner, output power differences are calculated for each of the subsequent periodic points t4, t5, and so on.

Further, at Step 201, the absolute value of the above-defined output power difference is compared with a predetermined reference value. If the absolute value is equal to or greater than the reference value ([the absolute value]≧[the reference value]), the process goes to Step 202.

At Step 202, it is determined whether the output power difference at each periodic point is positive or negative. When the output power difference is positive, the process proceeds to Step 203. When the output power difference is negative, the process proceeds to Step 204.

At Step 203, the output power difference is multiplied by a predetermined coefficient, such as 1/n (n is a natural number), to produce a positive "adjusting value."

Likewise, at Step 204, the output power difference is multiplied by a predetermined coefficient, such as 1/n (n is a natural number), to produce a negative "adjusting value."

At Step 205, the adjusting value is added to the moving average to find a "moving average revised value" for each of the periodic points. In this connection, turning back to Step 201, if the absolute value of the output power difference is smaller than the predetermined reference value ([the absolute value]<[the reference value]), the process directly goes to Step 205. This means that the moving average calculated at Step 100 remains original, i.e., without being modified via Steps 202 and 203 or 204. In this case, the "moving average revised value" can be interpreted as being equal to the original moving average by regarding the above-mentioned "adjusting value" as zero ([the original moving average]+ [0]=[the moving average revised value]).

At Step 300, the moving average revised values at the current periodic point and the predetermined number of previous periodic points are subjected to the calculation of a regression curve (which may be a quadratic or cubic curve). The following steps 400 and 500 are the same as those described above with reference to the flow chart of FIG. 2.

According to the inverter control method of the second embodiment, an adjusting value is calculated based on the difference between the moving average and the output power, and the resultant adjusting value (including 0) is added to the moving average. In this manner, the difference between the latest moving average and the latest output power can be reduced, whereby the output power can be approximated more accurately by the moving average. As a result, a more appropriate regression curve is obtained, and therefore a more reliable estimation can be made for the output power at the next periodic point.

<Embodiment 3>

Figure 4:
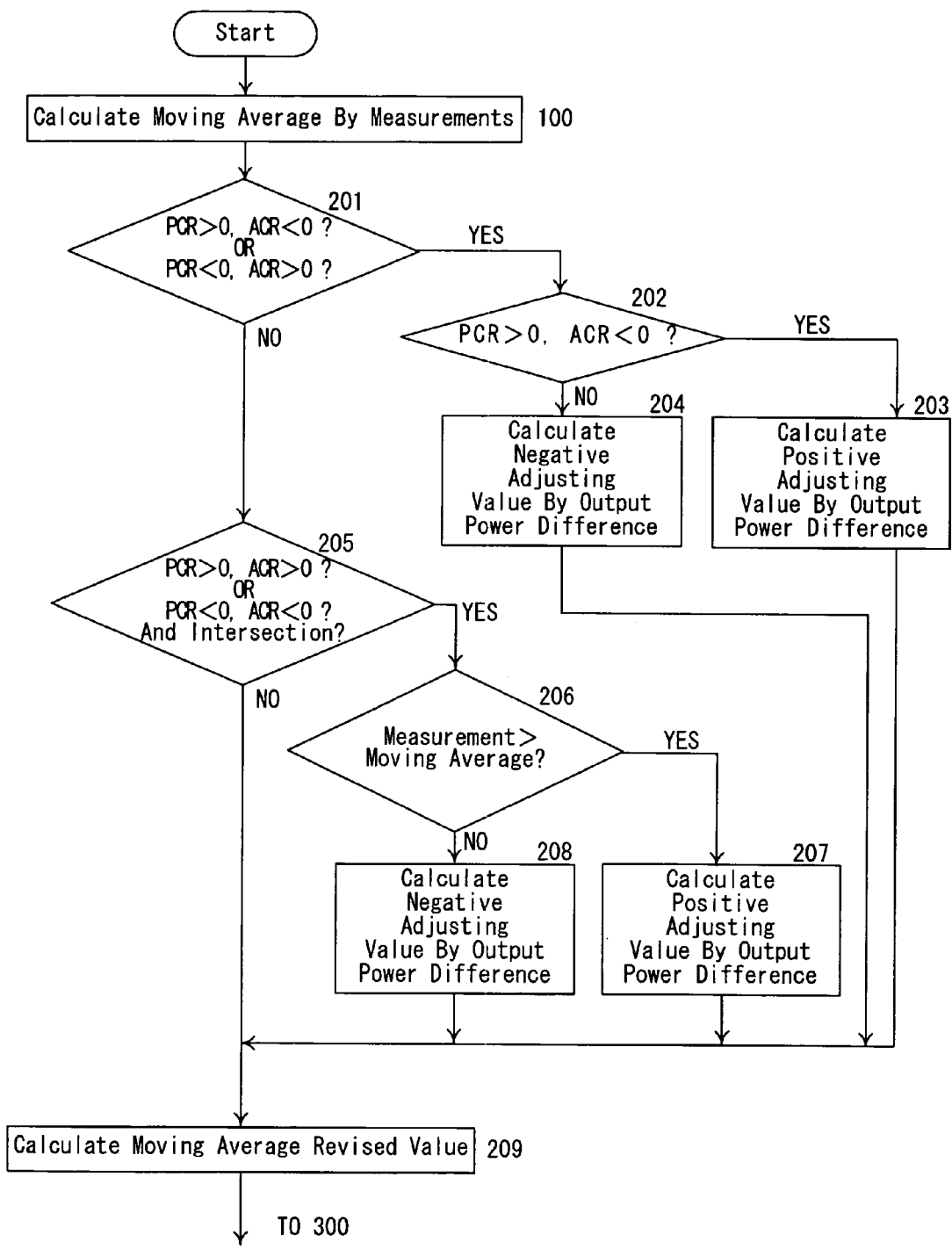
FIGS. 4 and 5 present a flow chart illustrating an inverter controlling method according to a third embodiment of the present invention.
Figure 5:
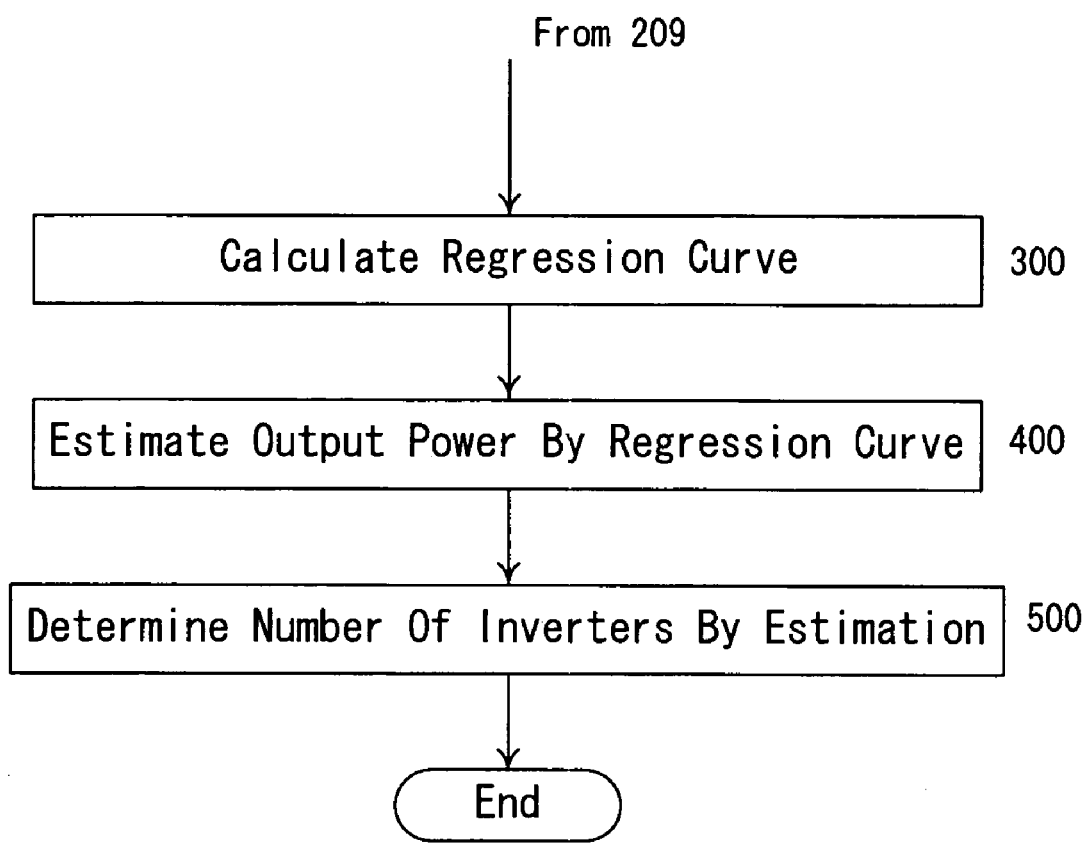

FIGS. 4 and 5 show a flow chart illustrating an inverter control method according to a third embodiment of the present invention.

At Step 100, as in the first and the second embodiments, the output power from the direct current power source DS are measured at predetermined periodic points, and the measurements are subjected to the calculation of moving averages at the respective periodic points.

Then, at Step 201, a change rate (inclination) is calculated based on the output power at the current periodic point (t=t3, for example) and the output power at the previous periodic point (t=t2, for example). The change rate ("power change rate" or "PCR") may be calculated by the following formula:

$$\frac{[outputpower(t3)] - [outputpower(t2)]}{t3 - t2}$$

Alternatively, the change rate may be calculated simply by subtracting the outputpower(t2) from the outputpower(t3). Likewise, another change rate ("average change rate" or "ACR") is calculated based on the moving average at the current periodic point and the moving average at the previous periodic point.

Further, at Step 201, it is determined whether one of the two change rates is positive and the other is negative. If YES, the process goes to Step 202. If NO (meaning that the two change rates are both positive or both negative) the process goes to Step 205.

At Step 202, it is determined whether the power change rate is positive and the average change rate is negative. If YES (a positive power change rate and a negative average change rate), the process goes to Step 203. If NO (a negative power change rate and a positive average change rate), the process goes to Step 204.

At Step 203, an "output power difference" is calculated based on the output power and the moving average. Then, the absolute value of the output power difference is multiplied by a predetermined coefficient (1/n, for example, where n is a natural number), to produce a positive adjusting value.

At Step 204, as in Step 203, an "output power difference" is calculated based on the output power and the moving average. Then, the absolute value of the output power difference is multiplied by a predetermined negative coefficient (−1/n, for example, where n is a natural number) to produce a negative adjusting value.

Then, at Step 209, the above-mentioned positive or negative adjusting value is added to the moving average at each periodic point, to produce a moving average revised value.

Turning back to Step 201, if NO, the process goes to Step 205, where it is determined whether both the power change rate and the average change rate have the same sign (i.e., both positive or both negative). Further, if the two rates have the same sign, it is determined whether there is an intersection between the power change rate and the average change rate. If YES, the process goes to Step 206. If NO, the process goes to Step 209. In this case, the "adjusting value" (mentioned below) is regarded as zero.

At Step 206, it is determined whether the output power is greater than the moving average. If YES, the process goes to Step 207, and if NO, the process goes to Step 208.

At Step 207, an output power difference between the output power and the moving average is calculated. Then the calculated difference (>0) is multiplied by a predetermined coefficient (such as 1/n, where n is a natural number), to produce a positive adjusting value.

At Step 208, as in Step 207, an output power difference between the output power and the moving average is calculated. Then the calculated difference (<0) is multiplied by a predetermined coefficient (such as 1/n, where n is a natural number), to produce a negative adjusting value.

At Step 209, the above-mentioned adjusting value (positive, negative or zero) is added to the moving average at each periodic point, to produce a moving average revised value.

Then, at Step 300, a regression curve is calculated based on an appropriate number of moving average revised values (including the one at the current periodic point).

At Step 400, the regression curve is used for estimating the output power at the next periodic point. At Step 500, the estimation is used for determining the number of inverters to be operated at the next periodic point.

According to the third embodiment, the power change rate and the average change rate are calculated. Further, with the use of these two change rates and the output power difference, an adjusting value for correcting the initially calculated moving average. In this manner, a more accurate regression curve is calculated, and therefore a more reliable estimation of the output power at the next periodic point can be made.

The invention claimed is:

1. An inverter controlling method for a power system that includes a DC power source and a plurality of inverters connected in parallel to the power source, the method comprising the steps of:
    measuring output power of the power source at a plurality of periodic points;
    calculating a moving average at each periodic point based on the measured output power;
    calculating a regression curve by utilizing moving averages at a current periodic point and past periodic points;
    estimating output power at a next periodic point based on the regression curve; and
    determining, based on the estimated output power, how many inverters to be actuated.

2. The method according to claim 1, further comprising the steps of:
    calculating a power difference between the moving average and the measured output power at each periodic point;
    calculating an adjusting value at each periodic point by utilizing the power difference at said each periodic point;
    calculating a moving average revised value at each periodic point by adding the adjusting value at said each periodic point to the moving average at said each periodic point;
    wherein the calculation of the regression curve is performed based on the moving average revised values at the current periodic point and the past periodic points.

3. The method according to claim 2, wherein the adjusting value at each periodic point is zero when the power difference at said each periodic point is smaller than a reference value, while the adjusting value is equal to the power difference multiplied by a coefficient when the power difference is no smaller than the reference value.

4. The method according to claim 3, wherein the coefficient is equal to 1/n (n is a natural number).

5. The method according to claim 2, further comprising the step of calculating a power change rate at each periodic point with respect to the output powers at said each periodic point and a previous periodic point, and the step of calculating an average change rate at said each periodic point with respect to the moving averages at said each periodic point and the previous periodic point, wherein the calculation of the adjusting value at said each periodic point is performed based on the power change rate, the average change rate and the power difference at said each periodic point.

* * * * *